April 30, 1968 KATSUYA ATSUMI 3,381,097

MECHANOELECTRIC ELIMINATION OF RESIDUAL MAGNETIZATION UTILIZING A SEPARATE BIAS HEAD

Filed Feb. 3, 1964 3 Sheets-Sheet 1

INVENTOR.
KATSUYA ATSUMI
BY Eyre, Mann & Lucas

INVENTOR.
KATSUYA ATSUMI
BY
Eyre, Mann & Lucas

INVENTOR.
KATSUYA ATSUMI
BY
Eyre, Mann, & Lucas

United States Patent Office 3,381,097

Patented Apr. 30, 1968

3,381,097
MECHANOELECTRIC ELIMINATION OF RESIDUAL MAGNETIZATION UTILIZING A SEPARATE BIAS HEAD

Katsuya Atsumi, Ohta-ku, Tokyo, Japan, assignor to Akai Electric Co., Ltd., Tokyo, Japan, a corporation of Japan Filed Feb. 3, 1964, Ser. No. 341,883
Claims priority, application Japan, Feb. 7, 1963, 38/4,775
5 Claims. (Cl. 179—100.2)

ABSTRACT OF THE DISCLOSURE

A tape recorder chassis panel is provided with an erase head, a record head and a playback head mounted in a row adjacent each other. A bias head is mounted on the panel opposite the record head and may be moved, through a segmental gear and pinion mechanism, between an on-service position adjacent the record head and an off-service position more remote from the record head. As this biasing head is retracted to its off-service position, a switch is automatically operated to close an energizing circuit for the biasing head during at least part of the entire retracting movement, whereby a gradually diminishing demagnetizing field is applied to the record head to avoid undesirable residual magnetization therein.

This invention resides in improvements in and relating to magnetic head arrangements of magnetic tape recording and playback machines, hereinafter called briefly as "tape recorders," employing an erase head, a record head, a separate high frequency biasing head cooperating therewith and a playback head.

Normally, the biasing head is fixedly positioned on the chassis of the tape recorder opposite the cooperative record head. The physical separation of the biasing head from the record head is used to achieve a superior cooperative relationship as compared to a unified or combined head.

In some cases, however, it has been already proposed to arrange the separated biasing head to be shiftable in position. The biasing head is thus kept at a preselected distance from the working surface of the record head so as to position the biasing head in an off-service position. When it is desired to initiate a recording operation, the biasing head is shifted to its operating position in opposition to the slit gap of the record head.

In all cases, however, it has been found that the record head is subjected to residual magnetization which accumulates with repeated recording operations. If such accumulated residual magnetization should exist, noises will be recorded on the cooperating magnetic tape, hereinafter briefly called "the tape," which results in inferior quality of the playback information from the tape.

It is therefore the main object of the present invention to provide a magnetic head arrangement which is capable of erasing possible residual magnetization of the record head in a unique mechano-electric way by utilizing the separated biasing head per se.

Another object is to provide a magnetic head arrangement of the kind above referred to wherein least possible wear on the working surface of the record head is assured, especially while in the forward or reverse fast tape drive operation of the tape recorder.

A further object is to provide a magnetic head arrangement of the kind above referred to, wherein the optimum cooperative relationship between the record head and the biasing head is achieved in the head assembling stage of manufacture of the tape recorder.

These and further objects of the invention will be readily understood in connection with the following detailed description with reference to the accompanying drawings which illustrate a preferred embodiment of the invention only by way of example.

In the preferred embodiment, the head arrangement of the tape recorder of the type referred to above, is characterized in the features that the biasing head is pivotally mounted from its off-service to its operating position (and vice versa) and a switch means is provided in an electric circuit including the energizing coil means of the head and an oscillator therefor, said switch means being opened after a predetermined time lag counted from the initiation of each receding pivotal movement of the head from its operating position and covering at least a predetermined initial stage of said receding movement.

Figure 4:
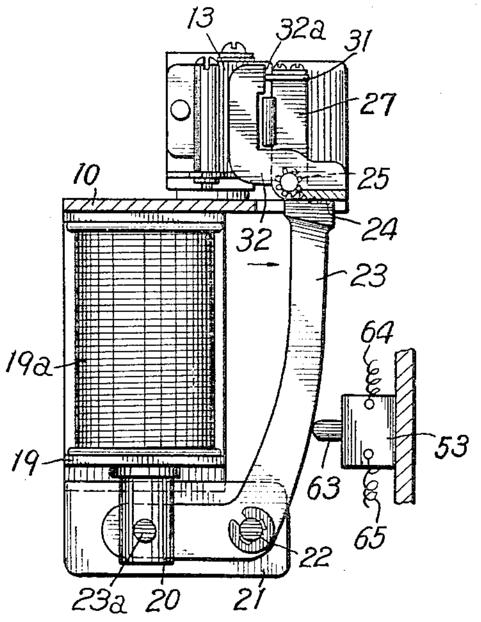
Figure 5:
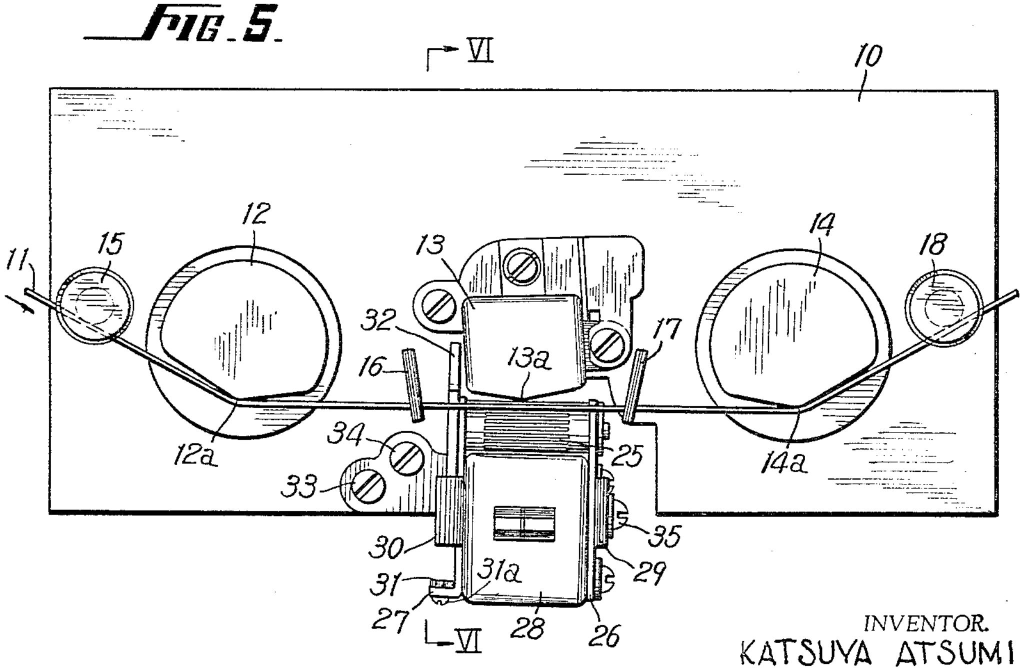
Figure 7A:
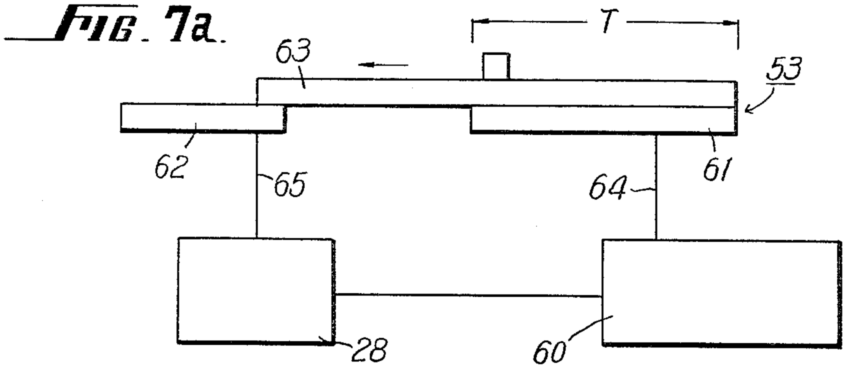
Figure 7B:
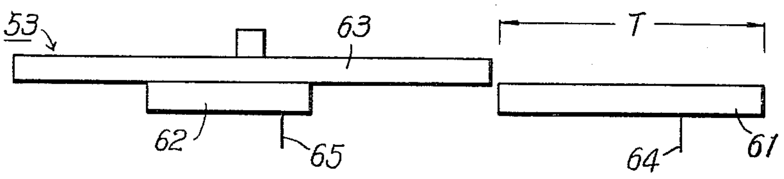
Figure 6:
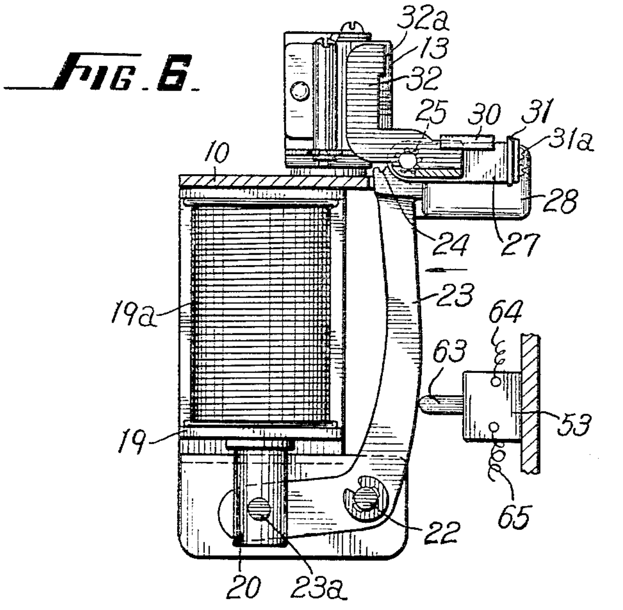
Figure 4A:
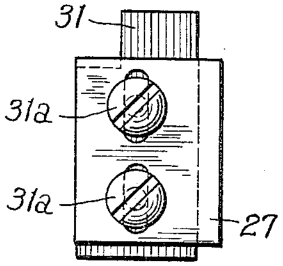

FIG. 4*a* is a cross-section taken in the plane of element 31 of FIGURE 4;

FIG. 5 is a top plan view of the novel head arrangement shown in its off-service position;

FIG. 6 is a cross-section similar to FIG. 4, yet showing the off-service condition of the biasing head assembly and taken along a sectional line VI—VI in FIG. 5; and FIGS. 7*a* and 7*b* are schematic explanatory drawings, showing the mode of delayed operation of a switch means which is controlled by the shifting movement of the biasing head assembly.

The term "front" or "rear" employed in connection with any one of the four magnetic heads throughout this specification refers to the slit gap of the respective head, such slit gap being deemed to be positioned in the "front" or working surface of the head.

Now referring to the drawings, 10 denotes a part of top panel of the conventional chassis of a tape recorder and an erase head 12, a record head 13 and a playback head 14 are fixedly mounted on the panel substantially in line and separately by small distances one after another. More precisely, however, slit gap 13*a* of the middle or record head is arranged offset rearwards only a small distance from an imaginary straight line passing through slit gaps 12*a* and 14*a* of the erase and playback heads, as will be best understood with reference to a newly threaded tape 11 (FIG. 5) shown in its fast wind position. A conventional leading tape guide post 15 is fixedly mounted on panel 10 at a distance from erase head 12 and rearwardly and laterally therefrom for guiding the tape 11 coming from a supply reel, not shown, to contact with the working surface of the erase head, including slit gap 12*a*. In the similar way, a trailing tape guide post 18 is provided fixedly on panel 10 at a distance separated from playback head 14 and rearwardly and laterally therefrom for guiding the tape moving past the magnetic head assemblies to a take-up reel, not shown, so as to keep it in contact with the working surface of the playback head, including slit gap 14*a*. A pair of intermediate, stationary tape guide posts 16 and 17 are mounted on panel 10 at the both sides of record head 13, being separated certain distances therefrom. These intermediate posts are so positioned that the bottom of each of the tape guiding channels 16*a* and 17*a* are offset rearwardly from the aforementioned gap-to-gap imaginary line.

A C-shaped plunger frame 19 is suspended fixedly from the bottom surface of panel 10 and supports a plunger coil 19*a* provided with a plunger 20. The plunger coil is electrically connected with a current source 51 and energizable only when a record control member such as record button, not shown, is manually operated so as to close a switch 52 inserted in the energizing circuit. The coil is de-energized when the control member is released from its actuated position so as to open the switch 52. Such control and energizing means are conventional. A bellcrank lever 23 is pivoted at 22 onto a supporting member 21 which is in turn fixedly attached to plunger frame 19 by means of set screws 21*a*. Lever 23 is connected at its lower end to the plunger 20 by means of a pin 23*a*, while the upper end of the lever is formed into a segmental gear 24 which meshes with a pinion 25. This pinion is integrally connected with a pair of angle members 26 and 27 at their lower end portions when seen in FIGS. 2 and 4. A high frequency biasing head 28 is also fixedly attached to these angle members, one of which 27 is pivotally supported by a stationary bracket 32. For this purpose, pinion 25 is formed with a shaft extension which acts as a pivot rotatably supported in the bracket 32 which is adjustably fixed on panel 10 by means of adjusting and set screws 33 and 34. In the operating position, shown in FIGS. 1, 2 and 4, the biasing head is kept separated a slight distance from the working front surface of the cooperating record head, although this separating distance is not clearly seen from the drawing on account of its unascertainable small value. For better guidance to the tape, shiftable tape guide means 29 and 30 are provided and mounted fixedly on angle members 26 and 27, respectively, at their front faces when seen towards the biasing head which is now assumed to be in its upstanding or operating position as shown in FIGS. 2 and 4.

A step 31 is attached fixedly, yet adjustably, to angle member 27 at its top end by means of adjustable screws 31*a* which passes through respective elongated openings formed in the member as most clearly seen from FIG. 4*a*. When the biasing head is brought into its operating position as will be more fully described hereinafter, the stop abuts against an upright surface 32*a* formed on bracket 32 which surface is most clearly seen from FIGS. 4 and 6. The abutting engagement between stop 31 and surface 32*a* will assure positively a predetermined gap distance between the biasing and record heads.

The movable tape guides 29 and 30 are also arranged in parallel relation with the front working surface of the biasing head. For attaining this condition, one of the two movable tape guides, for instance that denoted 29 in the present embodiment shown, is adjustable in its lateral position relative to the tape by means of an adjusting screw 35, although the details thereof are not shown in the drawing.

Plunger coil 19*a* is electrically connected with a current source 51 through a manually operable switch 52 as already described hereinbefore. In the operating range of bellcrank lever 23, a microswitch 53 is provided. This microswitch is so designed and arranged that during the receding movement of the lever, it is opened only after a predetermined time lag so as to open an electrical circuit including the biasing head and a conventional oscillator, as will be more clearly described hereinbelow with reference to FIG. 7.

Figure 2:
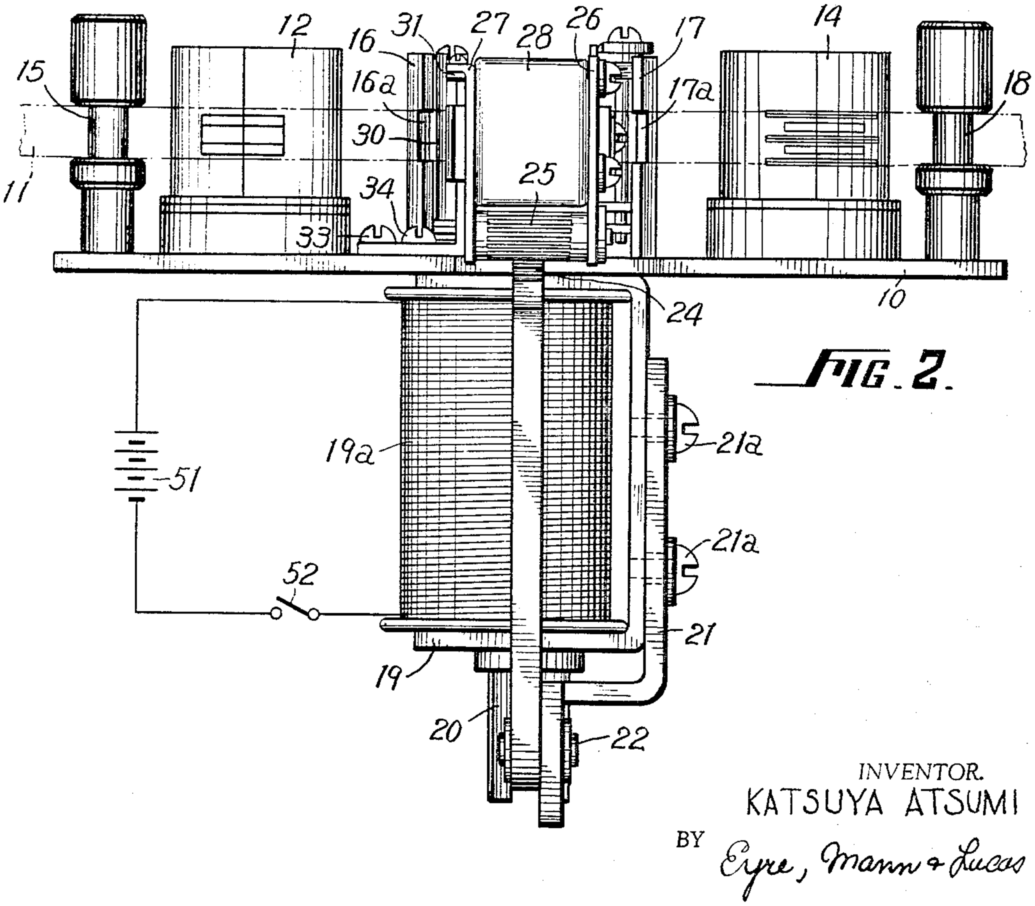
FIG. 2 is a front view of the head arrangement shown in FIG. 1, together with a schematic circuit for energization of a plunger coil employed.
Figure 3:
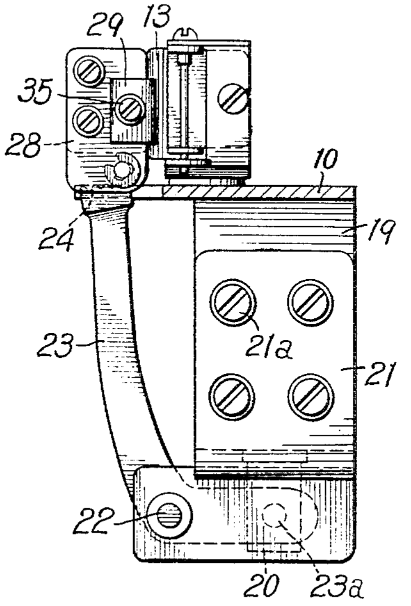
FIGS. 3 and 4 are cross-sections taken along sectional planes III—III and IV—IV in FIG. 1, respectively.

When the tape recorder is to be operated, the tape 11 is threaded from the supply reel to the take-up reel via post 15, erase head 12, posts 16 and 17, playback head 14 and post 18. In order to initiate a recording operation, push button-operated manual switch 52 is closed and thus plunger coil 19*a* is energized. By this energization of the coil, plunger 20 is raised from its lower idle position shown in FIG. 6 to its upper operating position shown in FIGS. 3 and 4. As a result, bellcrank lever 23 is pivotally shifted a partial revolution about pivot pin 22 in the clockwise direction in FIG. 6, whereby the gear segment 24 causes the meshing pinion 25 and the biasing head assembly to turn in the counter-clockwise direction. In this way, the biasing head is brought from its off-service position shown in FIGS. 5 and 6 into its operating position shown in FIGS. 1–4, until stop 31 abuts against the stationary abutting surface 32*a*. Simultaneously, the movable tape guides 29 and 30 advance pivotally into their operating position, whereby the tape is brought into full contact with stationary guide posts 16 and 17, on the one hand, and with the front working surface of the record head 13, on the other hand, thus forming a wavy threaded path.

Figure 1:
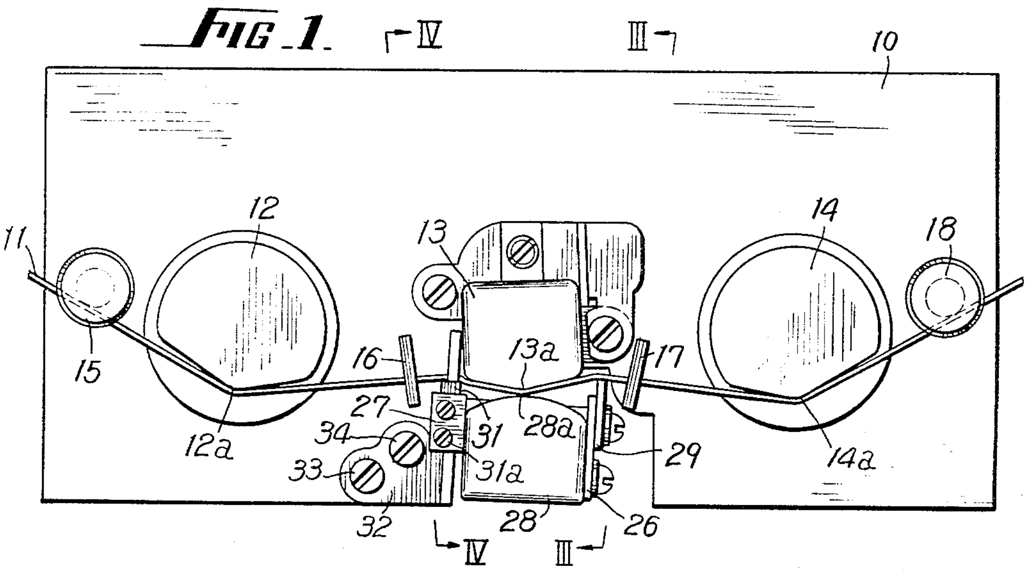
FIG. 1 is a top plan view of the novel head arrangement shown in its operating position.

When a conventional main switch, not shown, is closed manually, a conventional motorized tape reeling mechanism including the supply reel and the take-up reel is operated so as to advance the tape from left to right in FIG. 1, and heads 12, 13 and 14 are energized as conventionally.

In this way, the tape is fed forward in contact with slit gap 13*a* of the record head and under subjection to the high frequency biasing magnetic field emanating from slit gap 28*a* of the biasing head which is now positioned in its operating position in the aforementioned way. It will be thus understood that a recording operation can be brought into effect as the tape moves.

When it is desired to stop the recording operation and a fast forward or reverse winding operation is to be initiated, as the case may be, switch 52 is manually opened so as to de-energize plunger coil 19*a*. Thus, the lever 23 is rotated in the counter clockwise direction in FIG. 4 by the gravitational force of its weight and that of the biasing head assembly, whereby microswitch 53 is opened with a predetermined time lag. During this initial period in which the biasing head is still energized, the high frequency field emanating from the biasing slit gap 28*a* applies to the record head a gradually diminishing demagnetizing field due to the gradually receding movement of the biasing head therefrom, thus providing a fully effective erase effect upon the record head.

The above briefly mentioned time lag effect of microswitch 53 is now more fully explained with reference to FIGS. 7*a* and 7*b*. FIG. 7*a* shows schematically the closed position of switch 53, wherein both stationary contacts 61 and 62 are conductively bridged over by means of movable contact 63. Thus a circuit including leads 64 and 65 biasing head 28 and a conventional oscillator circuit 60, represented only by a rectangular block for simplifying the drawing, is kept closed.

When the biasing head assembly together with bellcrank lever 23 is rotated in the receding direction as in the aforementioned way, movable contact 63 of the microswitch is forced to gradually recede in the direction shown by a small arrow in FIG. 7*a*. When a time lag as represented by T in FIGS. 7*a* and 7*b* has elapsed, contacts 61 and 62 are opened so that the high frequency biasing circuit is de-energized. This shut-off condition of the switch contacts is shown schematically in FIG. 7*b*.

When a certain time period after the completion of opening of the microswitch has elapsed, the biasing head assembly is brought into its rest tposition shown in FIGS. 5 and 6.

When the tape drive mechanism is put into a conventioned fast forward or reverse drive condition to drive the tape in the forward direction shown by a small arrow in FIG. 5, or conversely in the reverse direction, the tape will run without contacting the slit gap area of the record head so that an otherwise possible engraving action in the working surface by the fast running tape is positively prevented. This effect is attributable mainly to the aforementioned arrangement of three heads 12–14, on the one hand, and to the provision of two movable tape guides 29–30, on the other hand.

Reproducing operation of the tape recorder may also be initiated with the biasing head assembly kept in its off-service position shown in FIGS. 5 and 6.

When it is desired to stop the tape recorder, the main switch is manually opened with the biasing head also kept in its off-service position.

In order to obtain the optimum recording condition of the biasing head, it must be accurately positioned relative to the record head and the tape. In practice, however, this optimum position will be somewhat different for each of the tape recorders due to the tolerance variations that are unavoidably encountered in mass production. In order to compensate for such manufacturing variations, adjusting means 31 and 33–34 may be advantageously utilized to acquire the optimum operating condition of the biasing head. For this purpose, a meter electrically connected with the playback head may be observed, while the playing head is cooperating with a running tape having recorded thereon standard frequency waves such as 1 kc. and 10 kc. by the record head 13, respectively, while manipulating the aforementioned adjusting means. When it is observed that an ample predetermined output current from the playback head is being measured by the meter, it will be known that the biasing head has been properly adjusted.

Although in the foregoing, a preferred embodiment of the invention has been described by way of example, the invention is not limited to the details of the embodiment shown and described. For instance, the biasing head may be arranged to pivot horizontally, thus not vertically, of the chassis panel. Further, if desired, the plunger-operated control mechanism for the biasing head may be exchanged by a correspondingly designed, finger-operated one. In the similar way, the combination of segmental gear and pinion may be replaced by a manual mechanism which has been designed to swivel the biasing head in the aforementioned way.

Finally, the microswitch may be of the rotary type instead of the sliding type. Contactless switch means may be also employed.

Other details of the shown and described embodiment may also be modified without departing from the gist of the invention as set forth in the appended claims:

What is claimed is:

1. Magnetic head arrangement of a tape recorder, comprising in combination: a chassis panel of said recorder; an erase head, a record head and a playback head arranged substantially in a row and separated small distances one after another fixedly on said panel; a high frequency biasing head; means for mounting said biasing head upon said panel and moving it reciprocally between an on-service position adjacent said record head by a predetermined spacing and an off-service position remote from said record head by a greater spacing, said mounting and moving means including a pinion connected to said biasing head and a pivotable lever having a gear segment at one end thereof, said pinion and gear segment being intermeshed so that upon reciprocal pivoting of said lever said pinion will rotate to pivotally move said biasing head between said on-service and off-service positions; switch means adapted to be operated by said mounting and moving means in response to movement of the latter and electrically connected in a circuit for energization of said biasing head, said switch means being arranged to close said energizing circuit during at least part of the movement of said biasing head from its on-service position to its off-service position.

2. Magnetic head arrangement as set forth in claim 1, which further comprises two movable tape guides rigidly connected to said biasing head so as to be positioned simultaneously with the positioning of said biasing head, said guides being adapted to urge a magnetic tape against the working surface of said record head when said biasing head is in its on-service position.

3. Magnetic head arrangement as set forth in claim 2, which further includes adjustable screw means mounted on said biasing head for adjusting the predetermined spacing of the on-service position thereof relative to said record head.

4. Magnetic head arrangement as set forth in claim 2, which further includes an operating plunger linked to said pivotable lever for pivoting the same and connected through a manually operable switch to a current source for energization of said plunger.

5. Magnetic head arrangement as set forth in claim 4, wherein the bias head energization switch means is a microswitch inserted in a circuit containing an energizing coil of said biasing head and an oscillator for the latter.

References Cited

UNITED STATES PATENTS

| | | | |
|---|---|---|---|
| 2,596,621 | 5/1952 | Van Loon et al. | 179—100.2 |
| 2,675,429 | 4/1954 | Rohling | 179—100.2 |
| 2,719,884 | 10/1955 | Reed et al. | 179—100.2 X |
| 2,733,300 | 1/1956 | Menard | 179—100.2 |
| 2,769,037 | 10/1956 | Dank et al. | 179—100.2 |
| 2,854,524 | 9/1958 | Went et al. | 179—100.2 |
| 2,862,781 | 12/1958 | Baumeister | 179—100.2 |
| 2,993,096 | 7/1961 | Radocy | 179—100.2 |

FOREIGN PATENTS

| | | |
|---|---|---|
| 925,318 | 3/1955 | Germany. |
| 1,032,565 | 6/1958 | Germany. |

BERNARD KONICK, *Primary Examiner.*

L. G. KURLAND, J. R. GOUDEAU, *Assistant Examiners.*